(12) United States Patent
Wideman (10) Patent No.: US 9,311,147 B2
(45) Date of Patent: Apr. 12, 2016

(54) METHOD FOR MEDIA ALLOCATION IN A PARTITIONED REMOVABLE MEDIA STORAGE LIBRARY

(75) Inventor: Roderick B. Wideman, Shakopee, MN (US)

(73) Assignee: Quantum Corporation, San Jose, CA (US)

( * ) Notice: Subject to any disclaimer, the term of this patent is extended or adjusted under 35 U.S.C. 154(b) by 1131 days.

(21) Appl. No.: 12/908,732

(22) Filed: Oct. 20, 2010

(65) Prior Publication Data

US 2012/0102288 A1 Apr. 26, 2012

(51) Int. Cl.
*G06F 3/06* (2006.01)
*G06F 9/50* (2006.01)

(52) U.S. Cl.
CPC ............ *G06F 9/5011* (2013.01); *G06F 3/0604* (2013.01); *G06F 3/0631* (2013.01); *G06F 3/0644* (2013.01); *G06F 3/0664* (2013.01); *G06F 3/0686* (2013.01)

(58) Field of Classification Search
None
See application file for complete search history.

(56) References Cited

U.S. PATENT DOCUMENTS

| | | | |
|---|---|---|---|
| 6,425,059 B1 * | 7/2002 | Basham et al. | 711/153 |
| 6,804,753 B1 * | 10/2004 | Moody et al. | 711/163 |
| 7,263,596 B1 * | 8/2007 | Wideman et al. | 711/209 |
| 8,117,619 B2 * | 2/2012 | LaFrese et al. | 718/104 |
| 2003/0050729 A1 * | 3/2003 | Basham et al. | 700/214 |
| 2003/0126361 A1 * | 7/2003 | Slater et al. | 711/114 |
| 2003/0126396 A1 * | 7/2003 | Camble et al. | 711/173 |
| 2004/0044852 A1 * | 3/2004 | Carlson et al. | 711/154 |
| 2004/0044854 A1 * | 3/2004 | Gibble et al. | 711/154 |
| 2004/0133915 A1 * | 7/2004 | Moody et al. | 725/86 |
| 2004/0139094 A1 * | 7/2004 | Tyndall et al. | 707/100 |
| 2005/0043852 A1 * | 2/2005 | Gallo et al. | 700/214 |
| 2006/0174088 A1 * | 8/2006 | Justiss et al. | 711/202 |
| 2008/0301396 A1 * | 12/2008 | Hamada et al. | 711/202 |
| 2011/0022760 A1 * | 1/2011 | Prigge et al. | 710/300 |

OTHER PUBLICATIONS

"Enterprise DistribuTape: Installation and Configuration Guide." Jun. 2008. Gresham Storage. http://greshamstorage.com/wp-content/uploads/2011/06/EDTACSLS8InstallationandConfigurationGuide.pdf. pp. 1-26.*
J. Deicke and W. Mueller. "Tape management in a storage networking environment." Jul. 2003. IBM. IBM Journal of Research and Development. vol. 47. pp. 453-457.*

* cited by examiner

*Primary Examiner* — Nathan Sadler
(74) *Attorney, Agent, or Firm* — Roeder & Broder LLP; James P. Broder (57) ABSTRACT

An open systems based media storage library system (10) for use by one or more hosts (5) includes a first hosted partition (12A) and a pool partition (14). The first hosted partition (12A) can be accessed by one of the hosts (5). Additionally, the first hosted partition (12A) includes a plurality of first hosted resources (16, 18). The plurality of first hosted resources (16, 18) can include a plurality of first hosted storage slots (16) and a plurality of first hosted storage media (18). The plurality of first hosted storage slots (16) includes one or more first physical storage slots (16P) and one or more first logical storage slots (16L). The plurality of first hosted storage media (18) are positioned within the first physical storage slots (16P). The pool partition (14) is inaccessible by any of the hosts (5). The pool partition (14) includes a plurality of pool resources (20, 22). One of the plurality of pool resources (20, 22) is selectively assigning to the first hosted partition (12A).

27 Claims, 6 Drawing Sheets

METHOD FOR MEDIA ALLOCATION IN A PARTITIONED REMOVABLE MEDIA STORAGE LIBRARY

BACKGROUND

Removable media storage libraries, e.g., automated tape libraries, often support partitioning the physical library into two or more logical libraries for presentation to the host application. Each host application then believes it has a dedicated library for use thereby providing a level of transparency to the host application. Each partition typically consists of a set of dedicated resources assigned to the partition, comprising data transfer devices, such as tape drives, storage slots, import/export slots, and removable media. The removable media can include data tape, which is tape that includes data that has been inputted via the particular host application, and scratch tape, which is tape that does not include any data that has been inputted via the particular host application. A robotics subsystem for moving resources between and/or among the partitions is then typically shared among the partitions. In some instances, the import/export slots may also be shared among the partitions.

One of the challenges with the use of partitions in a removable media storage library is in resource planning. The quantity of each resource, including drives, slots and media, needs to be identified in advance of defining and configuring a partition. Unfortunately, the need to identify specific quantities of resources in advance can be difficult and can lead to potential problems within individual partitions and within the storage library as a whole. For example, allocating too many slots to any one partition that remain unoccupied may create a shortage for another partition that needs them. Additionally, allocating too few slots to any one partition may not provide sufficient storage for removable media for that partition.

Further, current logical library partitions are separate entities that do not allow quick and efficient movement of resources from one logical library partition to another logical library partition. For example, the current system does not allow an application or user to move a tape cartridge from one logical library partition to another without first exporting the tape cartridge out of the library and then importing the tape cartridge back into the library. Accordingly, when resource allocation issues are encountered, a system administrator might be required to manually reconfigure several partitions in order to effectively re-allocate the existing resources. For instance, if one partition requires more media, and the partition has no more available storage slots, an administrator may reduce the number of slots assigned to one or more other partitions and then assign the slots to the partition needing them. This process ends up being cumbersome, and can affect several partitions. Further, in this instance, the configuration process is not done in direct terms of the resource needed, i.e. media. This is especially true of open systems-based storage libraries, such as those that support the SCSI Media Changer command set. Instead, the reconfiguration is done indirectly, in terms of the slots for the media, rather than the media itself.

Additionally, host accessible movement of resources from one partition to another could lead to the unintentional compromising of one partition's data tape into another partition's scratch tape.

SUMMARY

The present invention is directed toward an open systems based media storage library system for use by one or more hosts. In certain embodiments, the open systems based removable media storage library system comprises a first hosted partition and a pool partition. The first hosted partition can be accessed by one of the hosts. Additionally, the first hosted partition includes a plurality of first hosted resources. The pool partition is inaccessible by any of the hosts. The pool partition includes a plurality of pool resources. One of the plurality of pool resources is selectively assigned to the first hosted partition.

In some embodiments, the plurality of first hosted resources includes a plurality of first hosted storage slots and a plurality of first hosted storage media. In one such embodiment, the plurality of first hosted storage media are positioned within some of the plurality of first hosted storage slots. Additionally, in certain embodiments, the plurality of first hosted storage slots includes one or more first physical storage slots and one or more first logical storage slots. In such embodiments, the plurality of first hosted storage media are positioned within the first physical storage slots. Further, in one such embodiment, the one of the plurality of pool resources is selectively assigned from the pool partition to one of the first logical slots in the first hosted partition.

In one embodiment, the plurality of pool resources includes a plurality of pool storage slots and a plurality of pool storage media. In such embodiment, the one of the plurality of pool resources is selectively assigned from the pool partition to the first hosted partition.

Additionally, in one embodiment, one of the plurality of first hosted resources can be selectively assigned from the first hosted partition to the pool partition.

Further, in certain embodiments, the open systems based removable media storage library system comprises a second hosted partition that can be accessed by one of the hosts. In such embodiments, the second hosted partition includes a plurality of second hosted resources. In one such embodiment, one of the plurality of pool resources is selectively assigned to the second hosted partition. Additionally, in one embodiment, one of the plurality of second hosted resources can be selectively assigned from the second hosted partition to the pool partition.

Moreover, in one embodiment, the open systems based removable media storage library system can include a SCSI based removable media storage library system.

Additionally, the present invention is further directed toward a method for sharing storage media within an open systems based removable media storage library system that is used by one or more hosts.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
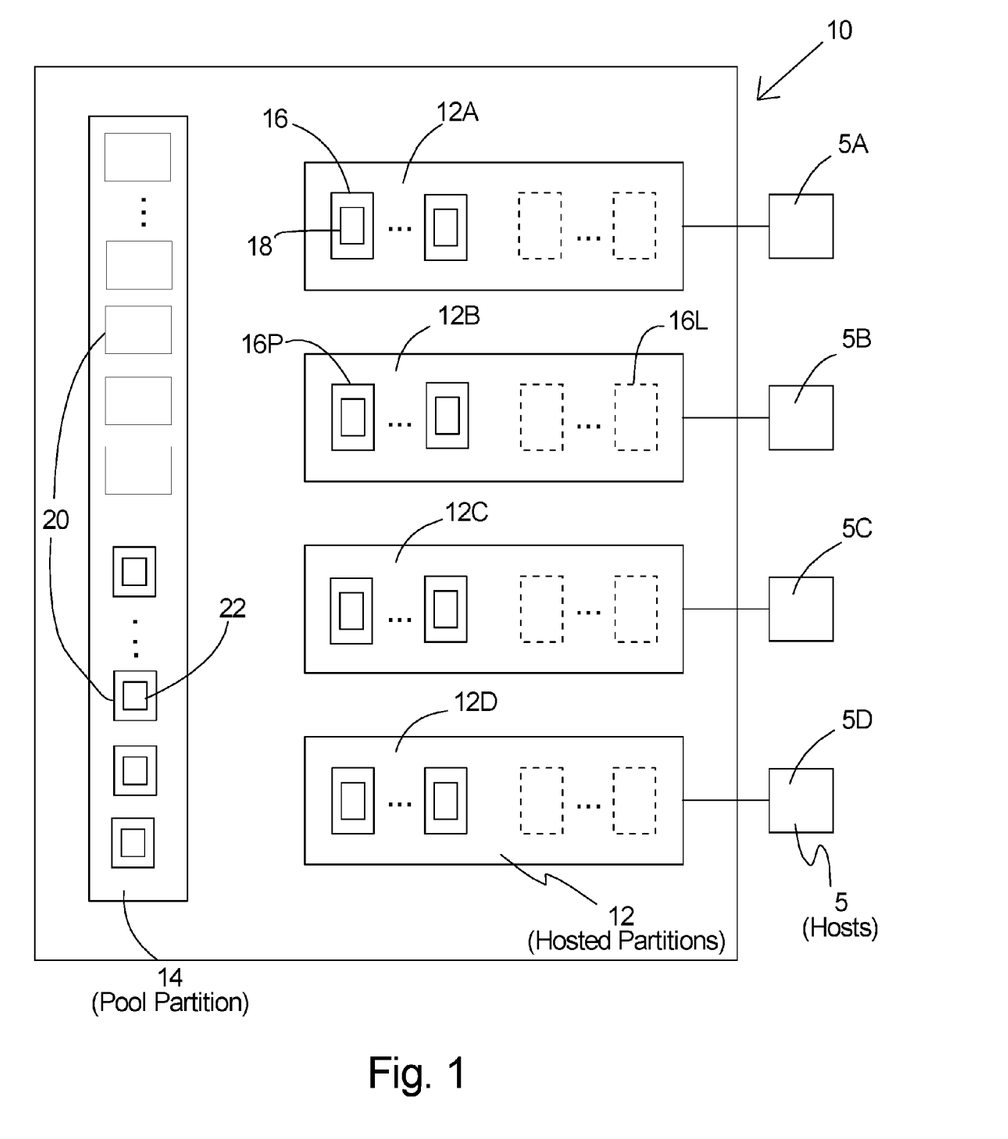
FIG. 1 is a simplified schematic illustration of one or more hosts and an embodiment of a removable media storage library system having features of the present invention.

FIG. 1 is a simplified schematic illustration of one or more hosts (illustrated generically as reference character 5) or users and one embodiment of a removable media storage library system 10 (also sometimes referred to herein as "library system") having features of the present invention. Although four hosts 5A-5D are illustrated in FIG. 1, it is recognized that any number of hosts can be wired and/or wirelessly connected for use with the library system 10. In particular, FIG. 1 illustrates the hosts 5A-5D and an embodiment of an open systems based library system 10. As utilized herein, the term "open systems based removable media storage library system" signifies a library system 10 that utilizes a set of standard commands, as opposed to a proprietary removable media storage library system that utilizes a set of proprietary, or unique, commands. In one embodiment, the open systems based library system 10 is a Small Computer System Interface ("SCSI") based removable media storage library system.

The design of the library system 10 can be varied. As illustrated in FIG. 1, the library system 10 includes one or more hosted partitions (illustrated generically as reference character 12) and a pool partition 14. In the embodiment illustrated in FIG. 1, four hosted partitions 12A-12D are illustrated. As utilized herein, each hosted partition 12 is a library partition that can be accessed by the one or more hosts 5, and the pool partition 14 is a library partition that is inaccessible by any of the one or more hosts 5. Typically, each hosted partition 12 is accessible or usable by one of the hosts 5. Alternatively, in some embodiments, each hosted partition 12 may be accessible to more than one of the hosts 5, and/or a single host 5 may have access to more than one hosted partition 12.

In the embodiment illustrated in FIG. 1, the first hosted partition 12A can be accessed by the first host 5A, the second hosted partition 12B can be accessed by the second host 5B, the third hosted partition 12C can be accessed by the third host 5C, the fourth hosted partition 12D can be accessed by the fourth host 5D, and the pool partition 14 is inaccessible by any of the hosts 5A-5D. Alternatively, the library system 10 can include more than four or less than four hosted partitions 12, and/or the hosted partitions 12 can be accessed by more than four or less than four hosts 5.

The design of each of the hosted partitions 12A-12D is substantially similar. For example, as illustrated in FIG. 1, each of the hosted partitions 12A-12D includes a plurality of hosted storage slots 16 and a plurality of hosted storage media 18. The plurality of hosted storage slots 16 and the plurality of hosted storage media 18 can also be referred to herein collectively and/or individually as the hosted resources. Additionally, each hosted storage slot 16 can be identified as either a physical storage slot 16P (illustrated as a solid box) or a logical storage slot 16L (illustrated as a dashed box). The physical storage slots 16P are hosted storage slots 16 that are accessible to the one or more hosts 5, as the physical storage slots 16P currently hold or store hosted storage media 18 that can be accessed by the one or more hosts 5. Conversely, the logical storage slots 16L are hosted storage slots 16 that are inaccessible to the one or more hosts 5, as the logical storage slots 16L do not currently hold or store any hosted storage media 18 that can be accessed by the host 5. In other words, the logical storage slots 16L are empty.

Each of the hosted partitions 12A-12D can include a number of hosted storage slots 16, i.e. physical storage slots 16P plus logical storage slots 16L, such that the total number of hosted storage slots 16 in the hosted partition 12A-12D does not exceed the maximum number of configurable storage slots that can be contained within the library system 10. As one non-exclusive representative example, the library system 10 can contain one thousand configurable storage slots. In this example, each of the hosted partitions 12A-12D could include up to one thousand hosted storage slots 16. Alternatively, in this example, one or more of the hosted partitions 12A-12D could include fewer than one thousand hosted storage slots 16.

Additionally, each of the hosted partitions 12A-12D can be substantially the same size or one or more of the hosted partitions 12A-12D can be a different size than the other hosted partitions 12A-12D. For example, each of the hosted partitions 12A-12D can include the same number of hosted storage slots 16 as each of the other hosted partitions 12A-12D, or one or more of the hosted partitions 12A-12D can include a different number of hosted storage slots 16 than each of the other hosted partitions 12A-12D. Somewhat similarly, each of the hosted partitions 12A-12D can include the same number of physical storage slots 16P, or one or more of the hosted partitions 12A-12D can include a different number of physical storage slots 16P than each of the other hosted partitions 12A-12D. Further, each of the hosted partitions 12A-12D can include the same number of logical storage slots 16L, or one or more of the hosted partitions 12A-12D can include a different number of logical storage slots 16L than each of the other hosted partitions 12A-12D. In one non-exclusive embodiment, using the same previous example of the library system 10 containing one thousand configurable storage slots, (i) the first hosted partition 12A can include one hundred physical storage slots 16P and one hundred fifty logical storage slots 16L (i.e. a total of two hundred fifty hosted storage slots 16), (ii) the second hosted partition 12B can include one hundred fifty physical storage slots 16P and one hundred logical storage slots 16L (i.e. a total of two hundred fifty hosted storage slots 16), (iii) the third hosted partition 12C can include two hundred fifty physical storage slots 16P and two hundred fifty logical storage slots 16L (i.e. a total of five hundred hosted storage slots 16), and (iv) the fourth hosted partition 12D can include two hundred fifty physical storage slots 16P and seven hundred fifty logical storage slots 16L (i.e. one thousand hosted storage slots 16). It is recognized that the foregoing example is provided for ease of understanding only, and is not intended to be limiting in any manner. For example, the total number of hosted storage slots 16 for each hosted partition 12A-12D can vary from that described in this example.

As shown in the embodiment illustrated in FIG. 1, the pool partition 14 can include a plurality of pool storage slots 20 and a plurality of pool storage media 22. The plurality of pool storage slots 20 and the plurality of pool storage media 22 can also be referred to herein collectively and/or individually as the pool resources. As illustrated, some of the plurality of pool storage slots 20 include and/or contain pool storage media 22, and some of the plurality of pool storage slots 20 do not include and/or contain pool storage media 22. In certain alternative embodiments, the pool partition 14 can be designed without any pool storage slots 20 that include and/or contain pool storage media 22.

It should be noted that the plurality of pool storage slots 20 that do not include and/or contain pool storage media 22 equate to the logical storage slots 16L that are assigned to the hosted partitions 12A-12D. Further, the logical storage slots 16L being illustrated as dashed boxes is intended to signify that some or all of the pool storage slots 20 in the pool partition 14 that are not populated by pool storage media 22 can be logically assigned to one or more of the hosted partitions 12A-12D.

Additionally, it should be noted that the total number of physical storage slots 16P in all of the hosted partitions 12A-12D plus the pool storage slots 20 in the pool partition 14 is also limited by the maximum number of configurable storage slots that can be contained within the library system 10. For example, if the library system 10 can contain one thousand configurable storage slots, then the total number of physical storage slots 16P in all of the hosted partitions 12A-12D plus the pool storage slots 20 in the pool partition 14 cannot exceed one thousand.

The pool partition 14 provides the pool storage media 22, i.e. scratch media that is available for data storage, that can be made readily available to any of the hosted partitions 12A-12D by a simple operation, e.g., by the click of a button. For example, in one embodiment, the pool storage media 22 can be selectively transferred to one or more of the hosted partitions 12A-12D on an as-needed basis. Additionally, as noted above, the pool partition 14 is inaccessible by any of the hosts 5A-5D. With this design, the pool storage media 22 in the pool partition 14 is inhibited from being inadvertently used until specifically allocated to one of the hosted partitions 12A-12D.

As such, the configured pool partition 14 effectively provides a staging location for providing additional storage media to those hosted partitions 12A-12D that need additional storage media. Further, since the pool partition 14 would contain pool resources that can easily be reassigned to one of the hosted partitions 12A-12D, there would no longer be a need for moving storage media from one hosted partition 12A-12D to another hosted partition 12A-12D. Moreover, as discussed in greater detail below, moving storage media from one of the hosted partitions 12A-12D to the pool partition 14 clearly indicates the intent to free the assigned storage media from its current assignment, and then allows that additional storage media to be assigned to another hosted partition 12A-12D as needed.

As illustrated in FIG. 1, some of the pool storage slots 20 can be positioned in the pool partition 14 with associated pool storage media 22 included within the pool storage slot 20. With this design, when one of the hosted partitions 12A-12D requires additional storage media and the hosted partition 12A-12D has the necessary hosted storage slot 16 to accommodate the additional storage media, the pool storage media 22 can be easily and/or independently transferred or assigned from the pool partition 14 to the hosted partition 12A-12D. Stated another way, when one of the hosted partitions 12A-12D requires additional storage media, and one or more logical storage slots 16L are available within that hosted partition 12A-12D, one of the logical storage slots 16L can be remapped as a physical storage slot 16P. Further, the pool storage media 22 will be transferred or assigned from the pool partition 14 to the hosted partition 12A-12D to be positioned within the newly remapped physical storage slot 16P.

Additionally, as illustrated in FIG. 1, some of the pool storage slots 20 positioned in the pool partition may contain no associated pool storage media 22 such that they are vacant. With this design, these vacant pool storage slots 20 in the pool partition 14 are capable of receiving hosted storage media 18 that are no longer required within the hosted partition 12A-12D. Additionally and/or alternatively, these vacant pool storage slots 20 in the pool partition 14 can receive additional storage media from other sources.

As an overview, the library system 10 enables the quick, easy and reliable movement or reassignment of pool resources from the pool partition 14 to any of the hosted partitions 12A-12D, and/or movement or reassignment of hosted resources to the pool partition 14 from any of the hosted partitions 12A-12D without requiring any reconfiguration of the hosted partitions 12A-12D or the host applications. Additionally, the library system 10 allows for the pooling of the pool storage media 22 within the pooled partition 14 to facilitate selective media assignments from the pool storage media 22 to any of the hosted partitions 12A-12D without the need for operator intervention to physically load and/or import additional storage media into the hosted partitions 12A-12D that require such additional storage media. Stated another way, the pool partition 14 will contain a number of tape cartridges, i.e. pool storage media 22 such as scratch tapes, that can be assigned and made available to one of the hosted partitions 12A-12D via a user-interface-initiated media assignment selection at any time.

During use, an administrator and/or one of the hosts 5A-5D may recognize a situation where one of the hosted partitions 12A-12D is in need of additional storage media. When such a situation arises, the administrator and/or the host 5A-5D will make a simple request of the library system 10 to provide additional storage media to the hosted partition 12A-12D. Subsequently, the library system 10 or administrator will evaluate whether the pool partition 14 has sufficient pool storage media 22 to share with the hosted partition 12A-12D, and whether the hosted partition 12A-12D has sufficient logical storage slots 16L into which the pool storage media 14 can be moved or assigned.

If the pool partition 14 has sufficient pool storage media 22 and the hosted partition 12A-12D has sufficient logical storage slots 16L, then the library system 10 simply reassigns pool storage media 22 from the pool partition 14 to the hosted partition 12A-12D. Thus, the logical storage slots 16L are remapped as physical storage slots 16P, and the pool storage media 22 that has been reassigned effectively becomes hosted storage media 18 that can be accessed and used by the host 5A-5D associated with the hosted partition 12A-12D.

If the pool partition 14 has sufficient pool storage media 22, but the hosted partition 12A-12D does not have sufficient logical storage slots 16L, then the library system 10 essentially reallocates and reassigns pool storage slots 20 and pool storage media 22 together as one from the pool partition 14 to the hosted partition 12A-12D. Thus, the pool storage slots 20 are remapped as physical storage slots 16P within the hosted partition 12A-12D, and the pool storage media 22 effectively becomes hosted storage media 18 that can be accessed and used by the host 5A-5D within the hosted partition 12A-12D.

Additionally, during use, the administrator and/or one of the hosts 5A-5D may recognize a situation where one of the hosted partitions 12A-12D no longer needs certain hosted storage media 18 that is present in the hosted partition 12A-12D. When such a situation arises, the administrator and/or the host 5A-5D can request that the library system 10 move the hosted storage media 18 that is no longer needed from the hosted partition 12A-12D to the pool partition 14. Subsequently, the library system 10 will then assign the hosted storage media 18 to the pool partition 14 so that it will become available to any of the hosted partitions 12A-12D as pool storage media 22. Additionally and/or alternatively, a backup application could be utilized to inform the library system 10 when hosted storage media 18 has expired and is available for use as scratch media, i.e. pool storage media 22. In such embodiments, the library system 10 would be able to automatically migrate the hosted storage media 22 back to the pool partition 14.

With the unique design of the present invention, a single pool of pool resources, i.e. pool storage slots 20 and pool storage media 22, can be set aside and used only when needed and the pool resources can be shared among the hosted partitions 12A-12D. This further enables the library system 10 to utilize a smaller total allocation of resources, which allows for a more efficient use of storage slots and storage media. Further, as described above, the pool storage media 22 can be replenished by identifying unused hosted storage media 18 from the hosted partitions 12A-12D and assigning them back to the pool partition 14.

Figure 2:
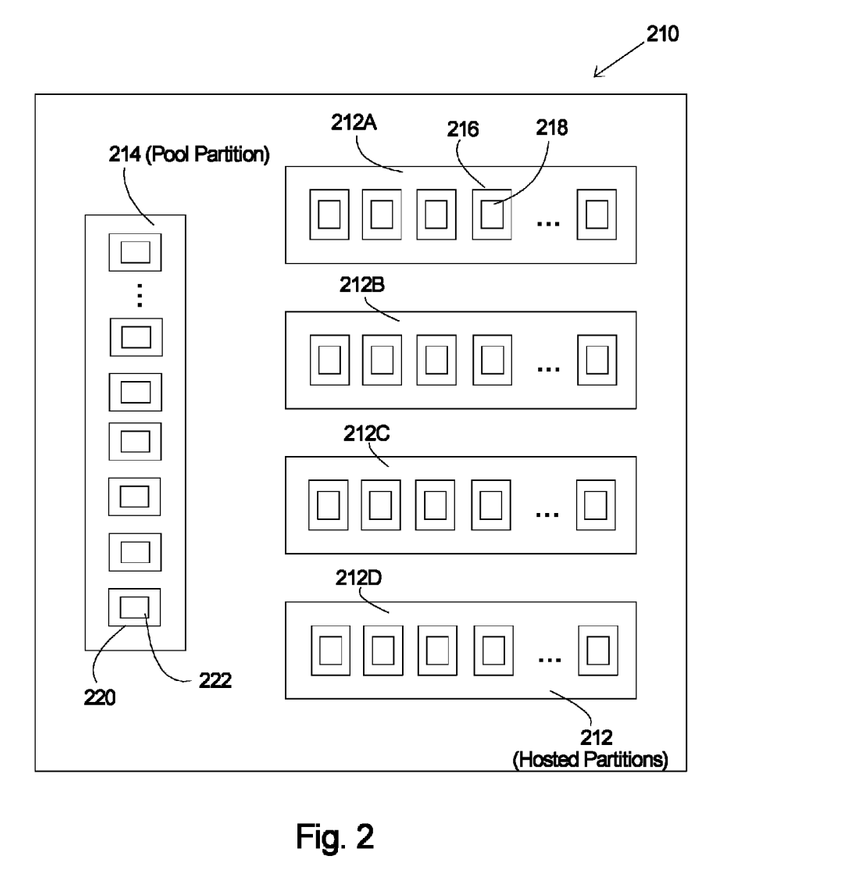
FIG. 2 is a simplified schematic illustration of another embodiment of the removable media storage library system.

FIG. 2 is a simplified schematic illustration of another embodiment of a removable media storage library system 210 (also sometimes referred to herein as a "library system") having features of the present invention. In particular, FIG. 2 illustrates another embodiment of an open systems based removable media storage library system 210.

The design of the library system 210 is somewhat similar to the library system 10 illustrated and described above in relation to FIG. 1. For example, as illustrated, the library system 210 includes one or more hosted partitions (illustrated generically as reference character 212) and a pool partition 214. In the embodiment illustrated in FIG. 2, four hosted partitions 212A-212D are illustrated.

As with the previous embodiment, each hosted partition 212 is typically accessible or usable by one of the hosts 5 (illustrated in FIG. 1). In particular, in the embodiment illustrated in FIG. 2, the first hosted partition 212A can be accessed by the first host 5A, the second hosted partition 212B can be accessed by the second host 5B, the third hosted partition 212C can be accessed by the third host 5C, the fourth hosted partition 212D can be accessed by the fourth host 5D, and the pool partition 214 is inaccessible by any of the hosts 5A-5D. Alternatively, the library system 210 can include more than four or less than four hosted partitions 212, and/or the hosted partitions 212 can be accessed by more than four or less than four hosts 5.

The design of each of the hosted partitions 212A-212D is substantially similar. For example, as illustrated in FIG. 2, each of the hosted partitions 212A-212D includes a plurality of hosted storage slots 216 and a plurality of hosted storage media 218. The plurality of hosted storage slots 216 and the plurality of hosted storage media 218 can also be referred to herein collectively as the hosted resources. In this embodiment, each of the hosted storage slots 216 is a physical storage slot that is accessible to the one or more hosts 5, as the hosted storage slots 216 currently hold or store hosted storage media 218 that can be accessed by the one or more hosts 5. Stated another way, in this embodiment, the hosted storage slots 216 include no logical storage slots.

In one embodiment, each of the hosted partitions 212A-212D can include the same number of hosted storage slots 216 as each of the other hosted partitions 212A-212D. Alternatively, one or more of the hosted partitions 212A-212D can include a different number of hosted storage slots 216 than each of the other hosted partitions 212A-212D.

As shown in the embodiment illustrated in FIG. 2, the pool partition 214 can include a plurality of pool storage slots 220 and a plurality of pool storage media 222. The plurality of pool storage slots 220 and the plurality of pool storage media 222 can also be referred to herein collectively as the pool resources.

The pool partition 214 provides the pool storage media 222, i.e. scratch media that is available for data storage, that can be made readily available to any of the hosted partitions 212A-212D by a simple operation. For example, in one embodiment, the pool storage media 222 can be selectively transferred or assigned to one or more of the hosted partitions 212A-212D on an as needed basis.

In the embodiment illustrated in FIG. 2, the pool storage media 222 is positioned effectively within the pool storage slots 220, such that each pool storage slot 220 includes and/or contains pool storage media 222. With this design, when one of the hosted partitions 212A-212D requires additional storage media, the pool storage media 222 and the pool storage slot 220 can be essentially transferred or assigned together from the pool partition 214 to the hosted partition 212A-212D.

During use, an administrator and/or one of the hosts 5A-5D may recognize a situation where one of the hosted partitions 212A-212D is in need of additional storage media. When such a situation arises, the administrator and/or the host 5A-5D will request that the library system 210 provide additional storage media to the hosted partition 212A-212D. Subsequently, the library system 210 will evaluate whether the pool partition 214 has sufficient pool storage media 222 to provide to the hosted partition 212A-212D. If the pool partition 214 has sufficient pool storage media 222, then the library system 210 essentially reallocates and reassigns pool storage slots 220 and pool storage media 222 together as one from the pool partition 214 to the hosted partition 212A-212D. Thus, the pool storage slots 220 are remapped as hosted storage slots 216 within the hosted partition 212A-212D, and the pool storage media 222 effectively becomes hosted storage media 218 that can be accessed and used by the host 5A-5D associated with the hosted partition 212A-212D.

Additionally, during use, the administrator and/or one of the hosts 5A-5D may recognize a situation where one of the hosted partitions 212A-212D no longer needs certain hosted storage media 218 that is present in the hosted partition 212A-212D. When such a situation arises, the administrator and/or host 5A-5D can request that the library system 210 move the hosted storage media 218 that is no longer needed from the hosted partition 212A-212D to the pool partition 214. Subsequently, the library system 210 will then reassign and reallocate the hosted storage media 218 and the related hosted storage slots 216 to the pool partition 214 so that they can become available to any of the hosted partitions 212A-212D as pool storage media 222 and pool storage slots 220. Additionally and/or alternatively, a backup application could be utilized to inform the library system 210 when hosted storage media 218 has expired and is available for use as scratch media, i.e. pool storage media 222. In such embodiments, the library system 210 would be able to automatically migrate the hosted storage media 222 and the hosted storage slots 220 back to the pool partition 214.

Figure 3A:
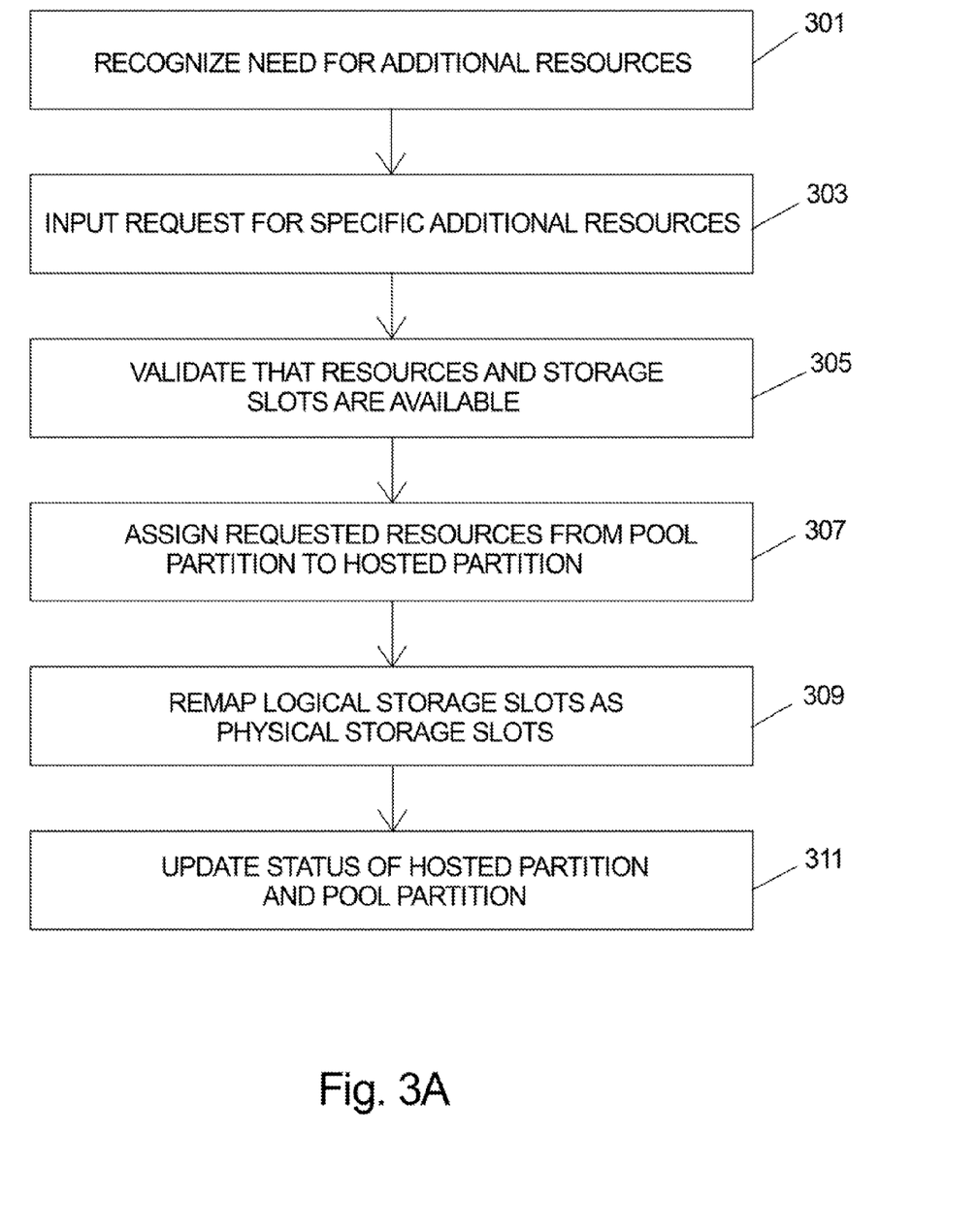
FIG. 3A is a simplified flow chart that outlines one embodiment of a process for moving one or more resources from a pool partition to a hosted partition within the removable media storage library system.

FIG. 3A is a simplified flow chart that outlines one embodiment of a process for moving or assigning one or more resources, e.g., storage media, from a pool partition to a hosted partition within a removable media storage library system (also sometimes referred to herein as "library system").

Initially, in step 301, an administrator or a host recognizes that the hosted partition requires additional resources.

In step 303, the administrator or the host inputs the resources, i.e. the type and quantity of storage media, that are required to be assigned to the logical storage slots of the hosted partition.

In step 305, the library system validates that the number of selected resources exist in the pool partition and that the required number of logical storage slots are available in the hosted partition.

In step 307, the library system assigns the requested resources from the pool partition to the logical storage slots within the hosted partition.

In step 309, the logical storage slots are remapped as physical storage slots in order to show the host that they are accessible and full.

In step 311, the status of the hosted partition is shown as online and ready, and the status of the pool partition is changed to properly reflect the partition modification and size reduction within the pool partition.

Figure 3B:
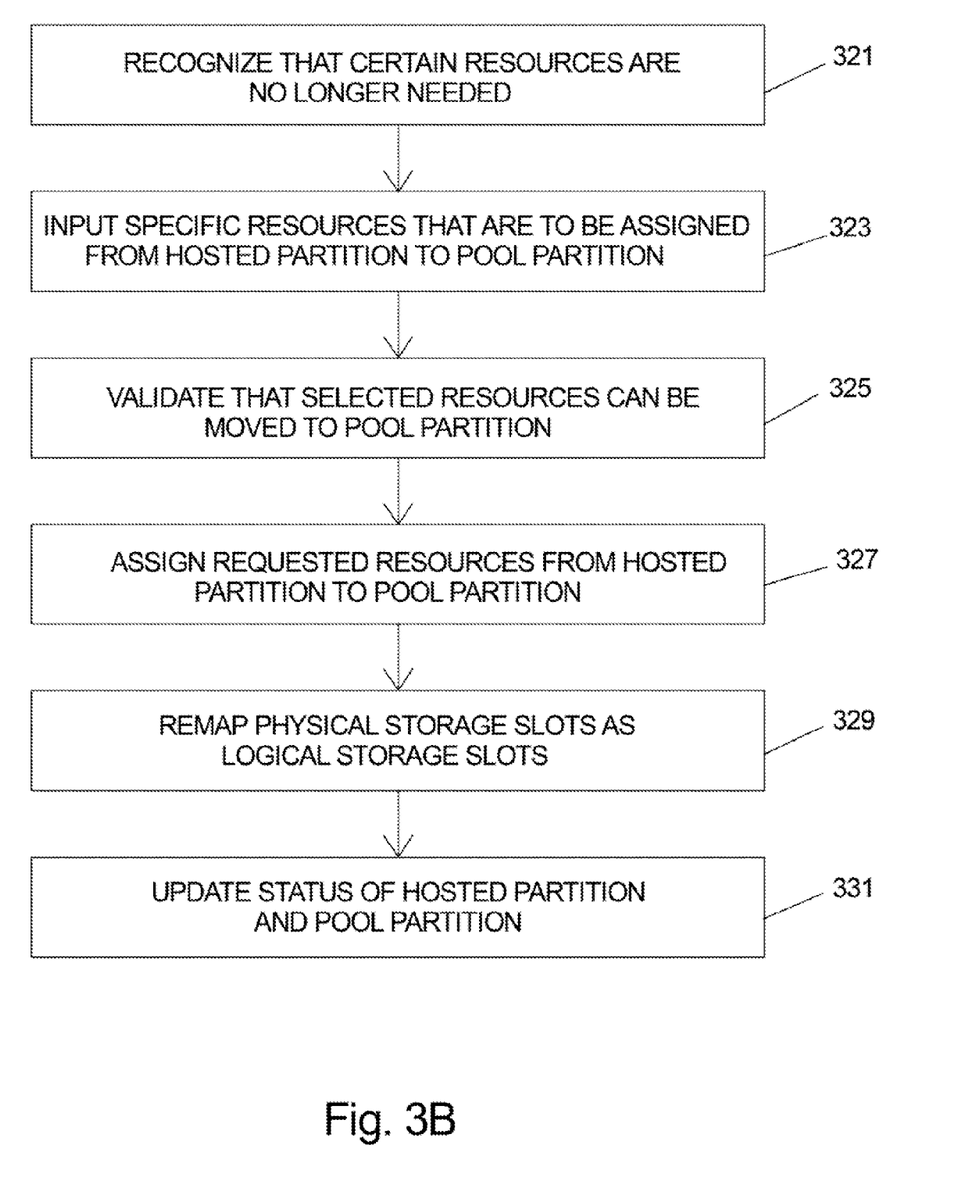
FIG. 3B is a simplified flow chart that outlines one embodiment of a process for moving one or more resources from the hosted partition to the pool partition within the removable media storage library system.

FIG. 3B is a simplified flow chart that outlines one embodiment of a process for assigning or moving one or more resources, e.g., storage media, from a hosted partition to a pool partition within a removable media storage library system (also sometimes referred to herein as "library system").

In step 321, an administrator, a host, or the library system itself recognizes that certain resources are no longer needed within the hosted partition.

In step 323, the administrator, the host or the library system itself inputs the specific resources, i.e. the type and quantity of storage media, that are no longer needed and that are going to be assigned from the hosted partition to the pool partition.

In step 325, the library system validates that the number of selected resources can be assigned to the pool partition.

In step 327, the library system assigns the requested resources from the hosted partition to the pool partition.

In step 329, the physical storage slots are remapped as logical storage slots in order to show the host that they are inaccessible and empty.

In step 331, the status of the hosted partition is shown as online and ready, and the status of the pool partition is changed to properly reflect the partition modification and size increase of the pool partition.

Figure 4A:
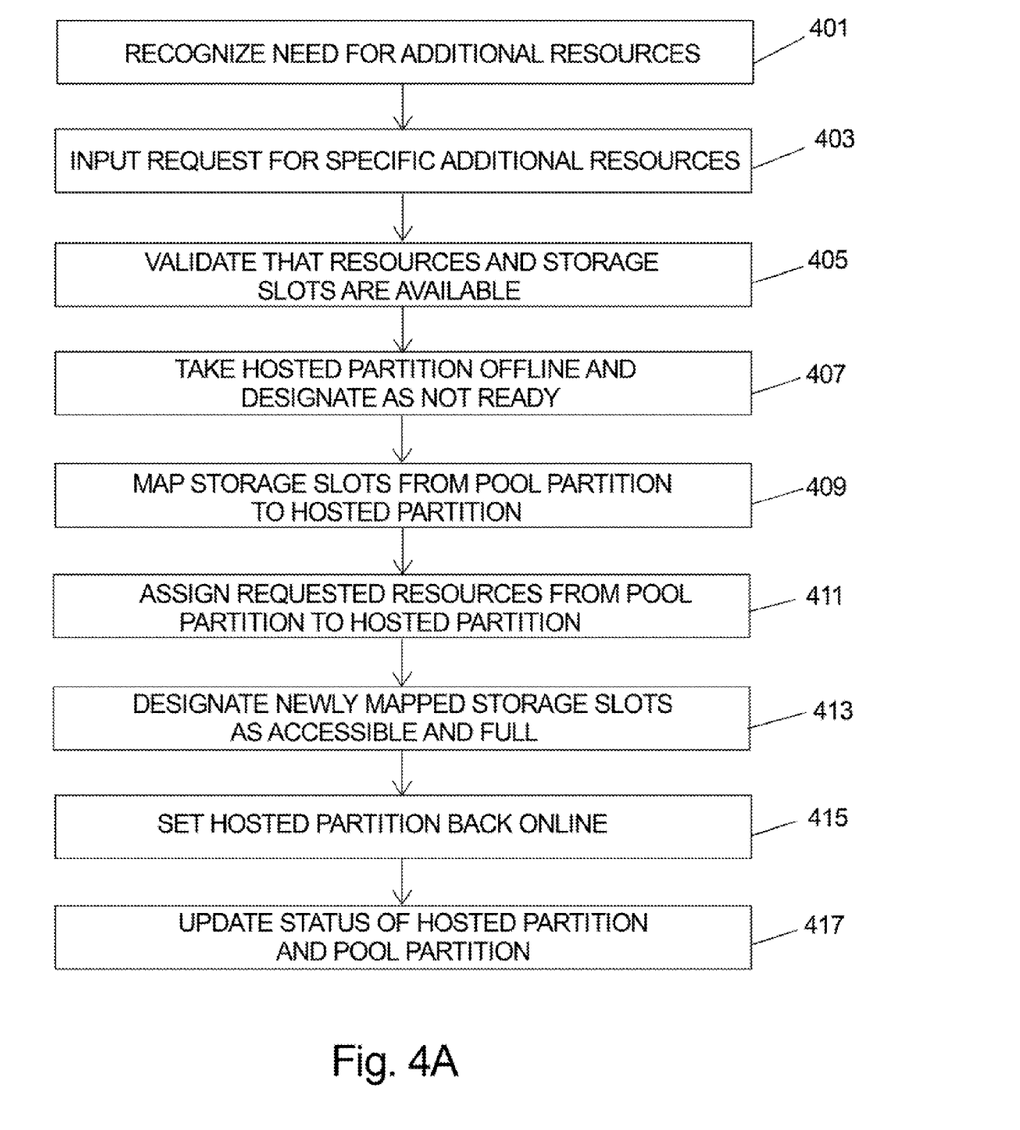
FIG. 4A is a simplified flow chart that outlines another embodiment of a process for moving one or more resources from the pool partition to the hosted partition within the removable media storage library system.

FIG. 4A is a simplified flow chart that outlines another embodiment of a process for assigning or moving one or more resources, e.g., storage media and/or storage slots, from a pool partition to a hosted partition within a removable media storage library system (also sometimes referred to herein as "library system").

In step 401, an administrator or a host recognizes that the hosted partition requires additional resources.

In step 403, the administrator or the host inputs the resources, i.e. the type and quantity of storage media, that are required to be assigned to the logical storage slots of the hosted partition.

In step 405, the library system validates that the required resources exist in the pool partition and are available to be assigned or transferred to the hosted partition.

In step 407, the hosted partition is taken offline and designated as not ready.

In step 409, the library system maps the associated storage slots from the pool partition to the hosted partition needing the resources.

In step 411, the library system assigns the requested resources from the pool partition to the newly mapped storage slots within the hosted partition.

In step 413, the newly mapped storage slots within the hosted partition are designated as accessible and full. Next, in step 415, the hosted partition is moved back online.

In step 417, the status of the hosted partition is shown as online and ready, and the status of the pool partition is changed to properly reflect the partition modification and size reduction within the pool partition.

Figure 4B:
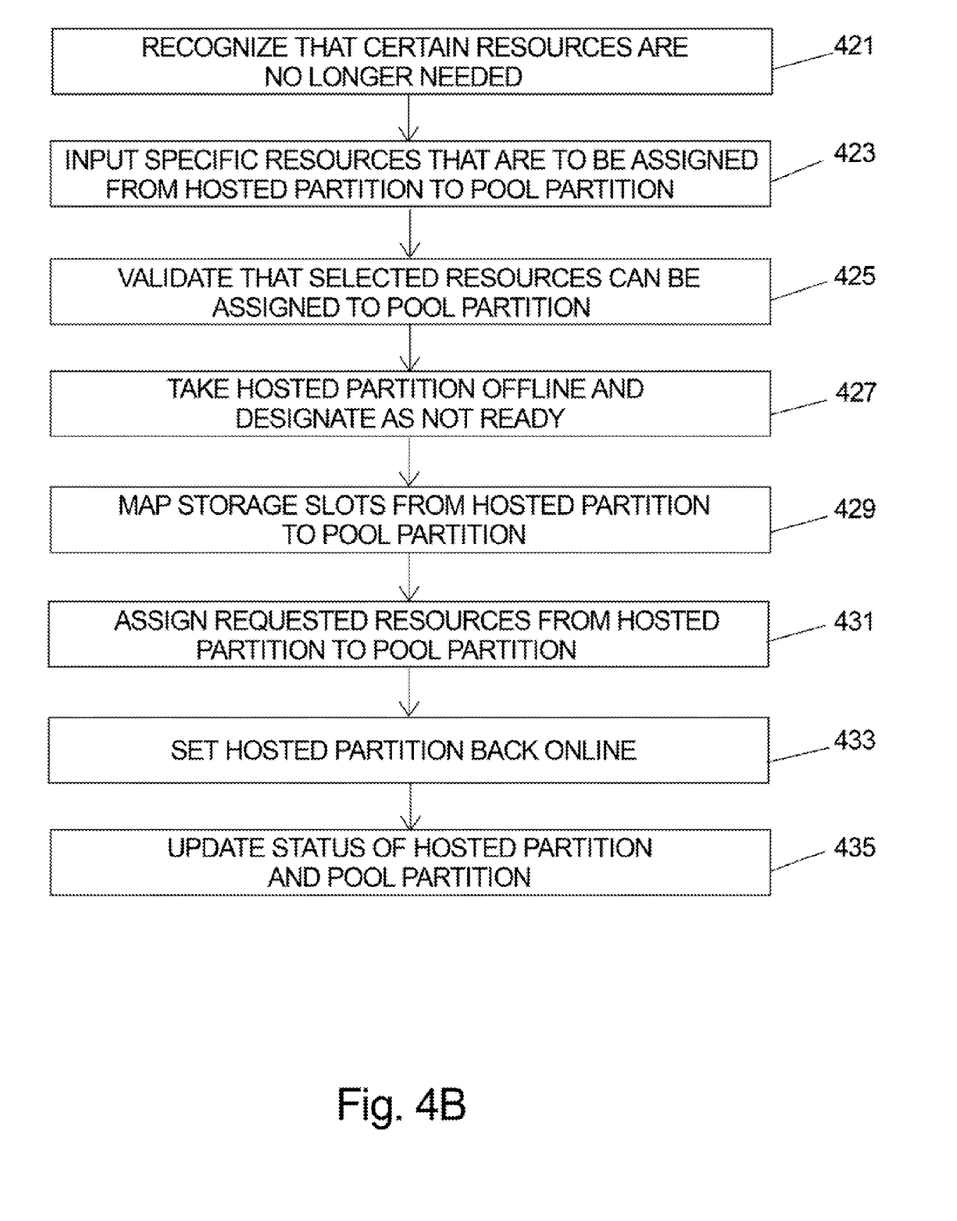
FIG. 4B is a simplified flow chart that outlines another embodiment of a process for moving one or more resources from the hosted partition to the pool partition within the removable media storage library system.

FIG. 4B is a simplified flow chart that outlines another embodiment of a process for assigning or moving one or more resources, e.g., storage media and/or storage slots, from a hosted partition to a pool partition within a removable media storage library system (also sometimes referred to herein as "library system").

In step 421, an administrator, a host, or the library system itself recognizes that certain resources are no longer needed within the hosted partition. In step 423, the administrator, the host or the library system itself inputs the specific resources, i.e. the type and quantity of storage media, that are no longer needed and that are going to be assigned from the hosted partition to the pool partition.

In step 425, the library system validates that the number of selected resources can be assigned to the pool partition.

In step 427, the hosted partition is taken offline and designated as not ready.

In step 429, the library system maps the associated storage slots from the hosted partition that no longer needs the resources to the pool partition. This effectively reduces the number of storage slots available in that hosted partition.

In step 431, the library system assigns the requested resources from the hosted partition to the newly mapped storage slots within the pool partition.

In step 433, the hosted partition is moved back online. In step 435, the status of the hosted partition is shown as online and ready, and the status of the pool partition is changed to properly reflect the partition modification and size increase within the pool partition.

It should be noted that some of the steps as described herein can be combined or omitted, additional steps can be added, and/or the order of some of the steps can be altered without otherwise changing the purpose and/or results of the above-recited processes.

While a number of exemplary aspects and embodiments of a removable media storage library 10 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An open systems based removable media storage library system for use by one or more hosts, the removable media storage library system comprising:
    a first hosted partition that can be accessed by one of the hosts, the first hosted partition including a plurality of first hosted resources; and
    a pool partition that is inaccessible by any of the hosts, the pool partition including a plurality of pool resources, wherein one of the plurality of pool resources is selectively assigned to the first hosted partition.

2. The library system of claim 1 wherein the plurality of first hosted resources includes a plurality of first hosted storage slots and a plurality of first hosted storage media.

3. The library system of claim 2 wherein the plurality of first hosted storage slots includes one or more first physical storage slots and one or more first logical storage slots, and wherein the plurality of first hosted storage media are positioned within the first physical storage slots.

4. The library system of claim 3 wherein the one of the plurality of pool resources is selectively assigned from the pool partition to one of the first logical slots in the first hosted partition.

5. The library system of claim 1 wherein the plurality of pool resources includes a plurality of pool storage slots and a plurality of pool storage media, and wherein the one of the plurality of pool resources is selectively assigned from the pool partition to the first hosted partition.

6. The library system of claim 1 wherein one of the plurality of first hosted resources is selectively assigned from the first hosted partition to the pool partition.

7. The library system of claim 1 further comprising a second hosted partition that can be accessed by one of the hosts, the second hosted partition including a plurality of second hosted resources, wherein one of the plurality of pool resources is selectively assigned to the second hosted partition.

8. The library system of claim 7 wherein one of the plurality of second hosted resources is selectively assigned from the second hosted partition to the pool partition.

9. The library system of claim 1 wherein the open systems based removable media storage library system includes a SCSI based removable media storage library system.

10. An open systems based removable media storage library system for use by one or more hosts, the removable media storage library system comprising:
  a first hosted partition including a plurality of first physical storage slots, a plurality of first logical storage slots, and a plurality of first hosted storage media that is positioned within the plurality of first physical storage slots, the plurality of first logical storage slots being inaccessible by any of the hosts; and
  a pool partition including a plurality of pool resources, wherein one of the plurality of pool resources is selectively assigned to the first hosted partition.

11. The library system of claim 10 wherein the plurality of pool resources includes a plurality of pool storage slots and a plurality of pool storage media, and wherein the one of the plurality of pool resources is selectively assigned from the pool partition to one of the first logical slots in the first hosted partition.

12. The library system of claim 10 wherein one of the plurality of first hosted storage media is selectively assigned from the first hosted partition to the pool partition.

13. The library system of claim 10 further comprising a second hosted partition including a plurality of second physical storage slots, a plurality of second logical storage slots, and a plurality of second hosted storage media that is positioned within the plurality of second physical storage slots, wherein one of the plurality of pool resources is selectively assigned to the second hosted partition.

14. The library system of claim 13 wherein one of the plurality of second hosted storage media is selectively assigned from the second hosted partition to the pool partition.

15. The library system of claim 10 wherein the pool partition inaccessible by any of the hosts.

16. The library system of claim 10 wherein the open systems based removable media storage library system includes a SCSI based removable media storage library system.

17. A method for sharing storage media within an open systems based removable media storage library system that is used by one or more hosts, the method comprising the steps of:
  providing a plurality of first hosted resources within a first hosted partition that can be accessed by one of the hosts;
  providing a plurality of pool resources within a pool partition that is inaccessible by any of the hosts; and
  selectively assigning one of the plurality of pool resources to the first hosted partition.

18. The method of claim 17 wherein the step of providing the plurality of first hosted resources includes the first hosted resources including a plurality of first physical storage slots, a plurality of first logical storage slots, and a plurality of first hosted storage media that is positioned within the plurality of first physical storage slots.

19. The method of claim 18 wherein the step of selectively assigning includes the step of selectively assigning one of the plurality of pool resources to one of the first logical slots in the first hosted partition.

20. The method of claim 19 further comprising the step of selectively assigning one of the plurality of first hosted resources from the first hosted partition to the pool partition.

21. The method of claim 17 further comprising the steps of providing a plurality of second hosted resources within a second hosted partition that can be accessed by one of the hosts, and selectively assigning one of the plurality of pool resources to the second hosted partition.

22. The method of claim 21 further comprising the step of selectively assigning one of the plurality of second hosted resources from the second hosted partition to the pool partition.

23. A method for sharing storage media within an open systems based removable media storage library system that is used by one or more hosts, the method comprising the steps of:
  providing a plurality of first hosted resources within a first hosted partition, the first hosted resources including a plurality of first physical storage slots, a plurality of first logical storage slots, and a plurality of first hosted storage media that is positioned within the plurality of first physical storage slots, the plurality of first logical storage slots being inaccessible by any of the hosts;
  providing a plurality of pool resources within a pool partition; and
  selectively assigning one of the plurality of pool resources to the first hosted partition.

24. The method of claim 23 wherein the step of selectively assigning includes the step of selectively assigning one of the plurality of pool resources to one of the first logical slots in the first hosted partition.

25. The method of claim 23 further comprising the step of selectively assigning one of the plurality of first hosted resources from the first hosted partition to the pool partition.

26. The method of claim 23 further comprising the steps of providing a plurality of second hosted resources within a second hosted partition, the second hosted resources including a plurality of second physical storage slots, a plurality of second logical storage slots, and a plurality of second hosted storage media that is positioned within the plurality of second physical storage slots; and selectively assigning one of the plurality of pool resources to the second hosted partition.

27. The method of claim 26 further comprising the step of selectively assigning one of the plurality of second hosted resources from the second hosted partition to the pool partition.

* * * * *